Figure 1:
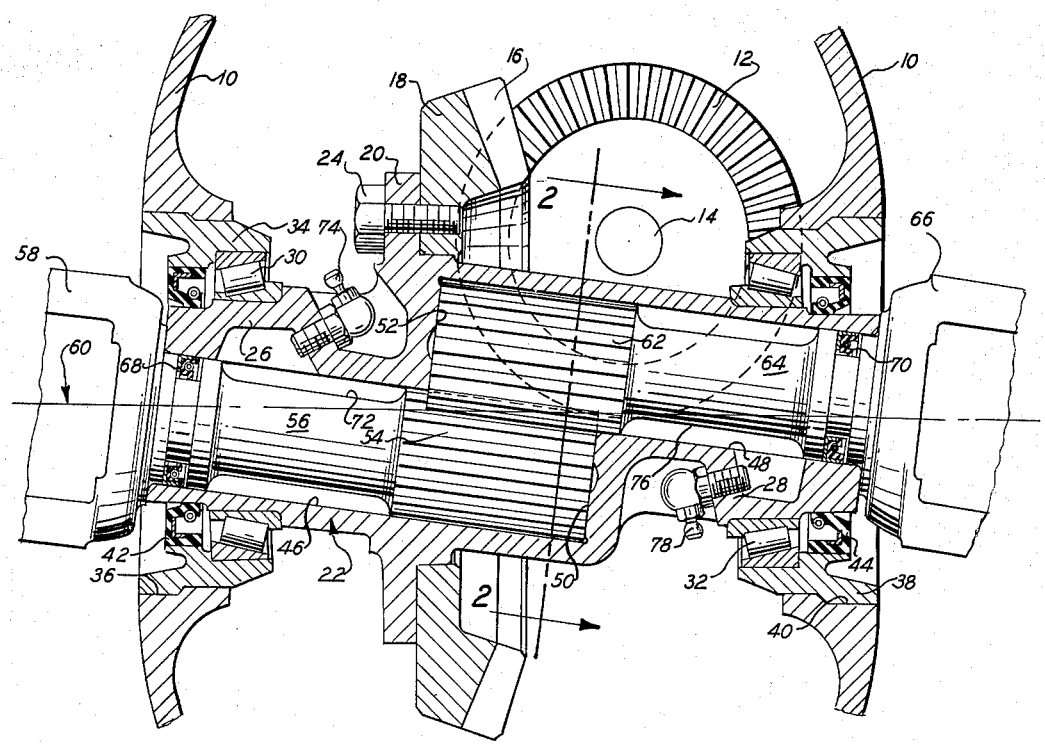

March 22, 1966  A. H. GALANIUK  3,241,388
DIFFERENTIAL DRIVE
Filed Aug. 10, 1962

ALEXANDER H. GALANIUK
INVENTOR

BY
ATTORNEYS

United States Patent Office 3,241,388
Patented Mar. 22, 1966

3,241,388
DIFFERENTIAL DRIVE
Alexander H. Galaniuk, Dormagen, Germany, assignor to The Ford Motor Company, Dearborn, Mich., a corporation of Delaware
Filed Aug. 10, 1962, Ser. No. 216,123
3 Claims. (Cl. 74—714)

My invention relates generally to power transmitting gear mechanisms. More particularly, it relates to a differential drive mechanism for engine driven vehicles.

I am aware of various types of geared differential drive mechanisms currently used with wheeled automotive vehicles. They function to establish a cross drive between a vehicle drive shaft and each of two transversely disposed axle shafts that in turn are connected drivably to the vehicle traction wheels. These drive mechanisms normally include a drive pinion connected to an engine driven drive shaft through a universal joint. The drive pinion meshes with a drive gear secured to a differential case that in turn is rotatably mounted within a differential carrier housing.

One end of each axle shaft extends through the axle shaft housing. A differential side gear is connected to each axle shaft end and is located within the differential case.

The differential case rotatably journals a plurality of differential pinions, each of which drivably engages the two differential side gears. As the drive pinion rotates, the differential case is driven about the axis of the axle shafts and torque therefore is distributed to each axle shaft through the differential side gears and the differential pinions.

According to a principal feature of my invention, I have provided a differential drive mechanism suitable for use in a wheeled vehicle that comprises a rotatable carrier and simplified torque transmitting geared connections between the carrier and each of two transversely disposed axle shafts. I have eliminated the need for providing a relatively complex differential pinion and side gear assembly.

The provision of a simplified differential drive mechanism of the type above set forth being a principal object of my invention, it is further object of my invention to provide a differential drive mechanism having a rotatable carrier and two rotary gear elements carried by the carrier in meshing engagement with each other, one gear element being coupled to one axle shaft and the other gear element being coupled to another axle shaft. The axle shafts may be situated for rotation about a common axis that is transversely disposed with respect to the axis of the driving pinion.

It is a further object of my invention to provide a gear mechanism of the type above set forth wherein the gear elements are situated for rotation about spaced parallel axes, the axes of the gear elements being angularly offset with respect to the axes of the axle shafts.

It is a further object of my invention to provide a differential gear mechanism of the type above set forth wherein the gear elements are drivably coupled to each of the two axle shafts through universal coupling means.

It is a further object of my invention to provide a differential drive mechanism of the type above set forth wherein the universal coupling means is defined in part by the gear elements.

Figure 2:
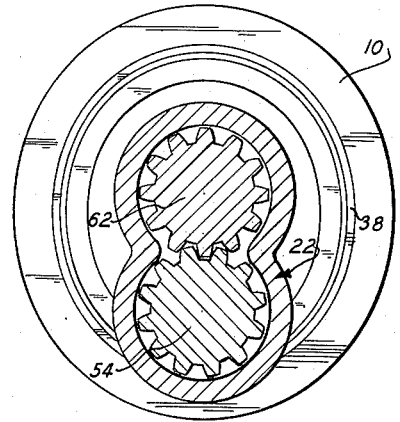

Further objects and features of my invention will become apparent from the following description and from the accompanying drawings, wherein:

FIGURE 1 shows a cross sectional assembly view of my improved differential drive mechanism; and FIGURE 2 is a transverse cross sectional view taken along section line 2—2 of FIGURE 1.

Referring first to FIGURE 1, the differential drive mechanism includes a stationary housing 10 that may be spring supported by a vehicle chassis in the usual fashion. A vehicle engine, not shown, is adapted to power a differential drive pinion 12 through a suitable drive shaft arrangement. The pinion 12 is journaled for rotation about its axis 14.

Drive pinion 12 is formed with bevel teeth which drivably engage mating bevel teeth 16 of the differential drive gear 18. The gear 18 and the pinion 12 form a right-angle power flow path.

Gear 18 may be bolted to a flange 20 on a differential carrier generally identified by reference character 22. Bolts 24 can be provided for this purpose. Carrier 22 includes a first extension 26 and a second extension 28, said extensions being disposed in opposed directions. Extension 26 is journaled for rotation by bearing 30 and extension 28 is journaled for rotation by bearing 32. Bearing 30 is situated within a bearing adapter 34 that in turn is received threadably within opening 36 in the casing 10. In a similar fashion, bearing 32 is carried by a bearing adapter 38 that in turn is received threadably within opening 40 in casing 10. A lubricant seal 42 seals the extension 26 with respect to the adapter 34 thereby maintaining lubricant within the casing 10. Likewise, a seal 44 is provided for the extension 28 to prevent fluid leakage through the adapter 38.

Carrier 22 is formed with a first bored opening 46 and a second bored opening 48. The axis of the opening 46 is offset with respect to the axis of bored openings 48 although it is parallel to it. The bearings 30 and 32 are axially aligned so that extensions 26 and 28 rotate about a common axis. This common axis, however, is disposed angularly with respect to each of the axes of bore openings 46 and 48.

The radially inward region 50 of bored opening 46 communicates with the radially inward region 52 of the bored opening 48.

Situated within bored opening 46 is a gear member 54 which is connected to or integrally formed with a shaft 56 situated within opening 46. Shaft 56 forms the stem of a yoke 58 which in turn forms a portion of a universal joint coupling that drivably connects gear 54 to an axle shaft. This axle shaft may be mounted for rotation about the axis of bearings 30 and 32, the latter being identified in FIGURE 1 by reference character 60.

Gear 54 drivably engages a gear 62 situated within the radially inward region 52 of bored opening 48. Gear 52 forms a part of or is connected to shaft 64 which in turn forms a stem for the universal joint yoke 66. The universal joint of which yoke 66 forms a part forms a driving connection between gear 62 and another axle shaft that is mounted for rotation about the axis 60. Each axle shaft can be connected to a separate traction wheel for the vehicle in conventional fashion.

A fluid seal 68 is formed about the shaft 56 in a suitable annular groove located near the outward end of bored opening 46. The adjacent shoulders for the seal 68 provide a running fit between the shaft 56 and the surrounding wall of the bored opening 46.

In a similar fashion, a fluid seal 70 is formed in a suitable annular groove at the outwardly extending portion of shaft 64. The shoulders adjacent the seal 70 provide a running fit between the shaft 64 and the surrounding wall of the bored opening 48.

Lubricant can be admitted to the annular cavity 72 that is defined by the intermediate portion of shaft 56 and the surrounding wall of the bored opening 46. This is done by means of a conventional grease fitting 74. In a similar fashion, lubricant can be admitted to the annular cavity 76 defined by the intermediate portion of shaft 64 and the surrounding wall of bored opening 48. Another conventional grease fitting 78 can be provided for this purpose.

As best seen in FIGURE 2, gears 62 and 54 are piloted within the surrounding wall of the bores 48 and 46, respectively. A close running fit between the bores and the outer surfaces of the teeth maintain the gears in proper meshing, conjugate relationship. The intersection of the regions 50 and 52 can be rounded as shown to eliminate sharp corners at these locations.

During operation, torque is delivered to differential drive gear 18 from the drive pinion 12. Thus, the carrier 22 is driven about the axis 60. Since the gears 62 and 54 in turn are carried by carrier 22, they function to distribute carrier torque to each of the yokes 58 and 66 thereby causing the traction wheels to exert a tractive effort for the vehicle. During normal forward drive operation, the torque delivered to each wheel will be substantially equal since the driving torque of pinion 12 is divided equally between the two axle shafts. Relative rotation of the gears 62 and 54 then is inhibited since the tangential gear tooth loads distributed to each of them are equal and opposite in direction. Thus, the turning torque on each gear 62 is balanced by the turning torque on gear 54.

During turning maneuvers of the vehicle, the traction wheel that is farther away from the center of the turn travels at a higher rate of speed than the traction wheel that is operating at a smaller turning radius. Gear 62 and gear 54 then must rotate relative to each other. Any degree of speed-up of one gear with respect to the speed of rotation of the carrier 22 will be accompanied by a corresponding decrease in the speed of rotation of the other gear with respect to the carrier speed. Thus, torque can be delivered continuously to each traction wheel during turning maneuvers of the vehicle regardless of whether one wheel rotates faster than the other.

Having thus described a preferred embodiment of my invention, what I claim and desire to secure by U.S. Letters Patent is:

1. In a differential drive mechanism for transferring power from a power output shaft to two driven members, a differential casing, a differential carrier rotatably journaled in said casing about a first axis, a pair of differential gears mounted upon said carrier in meshing engagement with each other, said differential gears being adapted to rotate about spaced parallel axes, a first universal joint yoke being connected to a first of said differential gears, said first yoke being located on one side of said casing, and a second universal joint yoke being connected to the other differential gear, the latter yoke being located on the other side of said casing, said carrier having cylindrical openings within which said differential gears are piloted, the outer surfaces of the teeth of said gears and the inner surfaces of said openings forming cooperating bearing surfaces.

2. In a differential drive mechanism for a wheeled vehicle, a gear carrier, means for mounting said carrier for rotation about a first axis, a drive gear carried by said carrier, a pinion meshing with said drive gear, said pinion having an axis of rotation that is disposed transversely with respect to said first axis, and a pair of differential gears journaled on said carrier for rotation about their respective axes, the differential gear axes being situated in spaced parallel relationship, the axis of one differential gear intersecting said one axis on one side of said carrier and the axis of the other differential gear intersecting said one axis on the other side of said carrier, said carrier having cylindrical openings within which said differential gears are piloted, each opening being of uniform diameter and opening to one side of said carrier to permit side entry of said gears, the outer surfaces of the teeth of said gears and the inner surfaces of said openings forming cooperating bearing surfaces.

3. In a differential drive mechanism for a wheeled vehicle having traction wheels at spaced locations, a gear carrier, means for mounting said carrier for rotation about a first axis, a drive gear carried by said carrier, means for poweing said drive gear to effect rotary motion of said carrier about said first axis, said carrier having a pair of cylindrical openings therein that extend in opposed directions to opposite sides of said carrier, the innermost portion of one opening communicating with the innermost portion of the other opening, and a differential gear situated in each of said portions in meshing engagement with respect to each other, each gear being journaled for rotation within its respective carrier opening, the other portions of each opening being of a diameter at least as large as the diameter of its innermost portion, the axes of said differential gears being situated in spaced parallel relationship and intersecting said first axis at spaced locations on the latter, the outer surfaces of the teeth of said gears and the inner surfaces of said openings forming cooperating bearing surfaces.

References Cited by the Examiner

UNITED STATES PATENTS

| | | | |
|---|---|---|---|
| 1,138,900 | 5/1915 | Smith | 74—714 |
| 2,139,906 | 12/1938 | Molly | 74—714 |

FOREIGN PATENTS

| | | |
|---|---|---|
| 382,725 | 12/1907 | France. |
| 537,808 | 1/1956 | Italy. |

DON A. WAITE, *Primary Examiner.*